(12) United States Patent
Pechenik et al.

(10) Patent No.: US 8,475,705 B1
(45) Date of Patent: Jul. 2, 2013

(54) BULK LOW COST INTERFACE-DEFINED LAMINATED METALLIC AND CERAMIC ENERGY BARRIER MATERIALS AND THEIR METHOD OF FABRICATION

(75) Inventors: Alexander Pechenik, Getzville, NY (US); Wesley P. Hoffman, Palmdale, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 260 days.

(21) Appl. No.: 12/728,293

(22) Filed: Mar. 22, 2010

Related U.S. Application Data

(60) Provisional application No. 61/162,349, filed on Mar. 23, 2009.

(51) Int. Cl.
*B28B 1/16* (2006.01)
(52) U.S. Cl.
USPC .......................................................... 264/639
(58) Field of Classification Search
USPC .......................................................... 264/639
See application file for complete search history.

(56) References Cited

U.S. PATENT DOCUMENTS

| | | | | |
|---|---|---|---|---|
| 5,234,641 | A * | 8/1993 | Rutt | 264/617 |
| 5,387,299 | A * | 2/1995 | Singh et al. | 156/89.26 |
| 5,779,833 | A * | 7/1998 | Cawley et al. | 156/89.11 |
| 6,447,712 | B1 * | 9/2002 | Dogan et al. | 264/608 |
| 6,811,741 | B2 * | 11/2004 | Pham et al. | 264/642 |
| 2005/0082726 | A1 * | 4/2005 | Hilmas et al. | 264/612 |

* cited by examiner

*Primary Examiner* — Joseph Del Sole
*Assistant Examiner* — Russell Kemmerle, III
(74) *Attorney, Agent, or Firm* — AFMCLO/JAZ

(57) ABSTRACT

This invention describes a unique of class of nano-scale materials for use as protective coatings or barriers against heat as well as material loss due to processes such as corrosion, ablation, erosion, or oxidation. These nano-scale laminated materials are also useful as free-standing components and as substrates, especially for high temperature oxidation-resistant applications. The novel materials of this invention are known as interface-defined nano-laminates (IDnLs), and are fabricated by a new method from ceramic, metallic, and other powders. The laminate layer thickness in an IDnL is smaller than that of ordinary laminates but greater than that of superlattices. Interface-defined nano-laminates are fundamentally different from ordinary laminates in that their properties are defined by interfaces, and not by the properties of the bulk materials comprising individual layers.

17 Claims, No Drawings

BULK LOW COST INTERFACE-DEFINED LAMINATED METALLIC AND CERAMIC ENERGY BARRIER MATERIALS AND THEIR METHOD OF FABRICATION

CROSS REFERENCE TO RELATED APPLICATION

This application claims the benefit of and priority to the filing date of U.S. provisional application Ser. No. 61/162,349, filed Mar. 23, 2009, incorporated herein by reference in its entirety.

RIGHTS OF THE GOVERNMENT

The invention described herein may be manufactured and used by or for the Government of the United States for all governmental purposes without the payment of any royalty.

BACKGROUND OF INVENTION

The present invention is concerned with a novel class of materials that fits between the ordinary industrial laminates and research-type superlattices and nanolaminates, in regards to their properties and cost. The novel Interface-Defined nano-Laminated materials of this invention differ from both the large-scale laminates and the extremely fine-scale superlattices, due to their unique micro- and nano-structures produced by the novel methods of fabrication. In the new IDnL materials the interfaces between the alternative layers can be designed and fabricated from many different materials. Also, these interfaces can have unique properties and structures, which can be varied from nearly coherent to completely incoherent by varying the processing approach. The degree of deviation from perfect coherency at the interfaces potentially can be controlled without much increase in cost of the IDnL materials.

In general, laminates can be made with layers having a wide range of thickness. The terms laminated materials or laminates generally refer to materials that consist of many parallel layers of relatively thick (layer thickness, t>1 mm) dissimilar materials. Laminates are utilized in many diverse fields, such as food preparation (French and German pastry), penetration-resistant materials (armor, bullet-proof glass), heat shields for satellites (NASA, DOD), as well as tools (metal cutting inserts), and weapons (Japanese samurai swords)—just to name a few.

The properties of laminates, in general, are controlled by two factors i.e. the properties of the material within the layers and the properties of the interfaces between the layers. When the number of layers is small (in this case a material usually referred to as 'layered'), it is predominately the properties of the materials within the individual layers that define the properties of the whole laminate. However, as the number of layers increases, the properties of the interfaces between the dissimilar layers begin to impose an ever increasing effect on the properties of the laminate. In some applications, it is the properties of the interfaces that are the determining factor in the performance of the whole laminate. For example, a reflecting insulator that consists of a number of metallic layers, each of which is an excellent conductor of heat and is separated from the next reflector by an air gap or vacuum, is, nevertheless, an excellent insulator because of the processes of reflecting and scattering of heat perpendicular to the metal/gas interfaces.

Laminates have many industrially useful properties. The properties of laminates are anisotropic, so they are often called '2-dimensional materials', because their properties in the plane of the layers and perpendicular to that plane are drastically different. For example, heat conductivity in the crystal plane and perpendicular to the crystal plane of pyrolytic graphite can differ by three orders of magnitude; fracturing goes easily along the glass planes in laminated glass, but is quickly arrested in the direction perpendicular to the glass planes; electrical current propagates in planes, but not perpendicular to the planes in metal/oxide laminates utilized in super-capacitors, etc.

The anisotropic properties of laminates can be highly useful in impeding conduction of heat as well as propagation of fracture, or chemical attack. Regardless of the form of the propagating entity, laminate materials usually inhibit propagation of the energy or matter in the direction perpendicular to the layers, while dissipating this energy or matter along the surface of the interfaces.

From a conceptual point of view, the process of obstructing the energy propagation can be described by a similar mathematics in all these cases, be it heat, stress wave that causes fracturing, or diffusion—each interface constitutes a barrier that has to be overcome by the incoming energy or matter in order to proceed through the material. Though each barrier may be small, the sheer number of them and their sequential nature ultimately overwhelms the incoming energy or matter and slows down the rate of its flow through the material to a small fraction of the original value. To illustrate this point: consider, for example, that one barrier reflects or scatters only 0.01% of the incoming energy, or 0.0001, letting 0.9999 through. 100,000 of these barriers placed apart at a distance of 100 nm would attenuate the flow of incoming energy to 1% of the starting value after the distance of only 1 centimeter.

In most cases the scattering at an interface is much higher than 0.01%. For the example of heat scattering at a metal/gas interface, the scattering is controlled by the emissivity and reflectivity of the metal surface, which can be above 50%. This is why only a few reflectors are necessary to contain very high temperatures. However, even when the scattering coefficient is small, the sheer number of barriers gives tremendous power to the approach of laminated materials. This is one of the reasons why nano-laminates—laminates with thicknesses of individual layers of the order of 1 to 999 nm and preferably from 1-100 nanometers, and superlattices, which are a subset of nano-laminates with strong, clearly defined interfaces, have attracted so much interest in the last decades, both in research and industry.

In contrast to the laminates with macroscopic thick layers discussed above are the nano-laminated materials and superlattices that have been researched extensively since the late 1970s. These are extremely finely-layered materials with the thickness of individual layers of the order of 1 to 10 nm. They are also prohibitively expensive for industrial applications for reasons outlined below. The word 'superlattice' was coined by physicists, who were the early investigators of these materials, to emphasize the existence of extra peaks in X-ray diffraction patterns of these materials. Traditionally, the word 'super-lattice' is used with nano-layered materials with coherent interfaces, i.e., when the lattice planes are continuous from one phase to another across the interface. When the interfaces are incoherent, the material is usually referred to as 'nano-layered'. (In the instant invention, the word 'nano-laminate' will be used for all these types of materials with layers of nanometer thickness up to 999 nanometers.) These nano-laminated materials have been found to have very intriguing and industrially-useful properties. The whole area is still an active research field in Materials Science and Physics. Electronic, magnetic, and mechanical properties of these materials are still actively researched, scientific conferences held, and new applications come out every year. New important properties, such as superior hardness/toughness combination, excellent wear resistance, super-modulus effects, superconductivity, optical waveguide properties, and magnetic properties are active areas of research in nano-laminates.

In the area of resistance to flow of heat, it was always expected that nano-laminates can be made to provide excellent resistance to heat flow on the basis of the multiple-barrier model discussed above. Each interface between dissimilar materials scatters phonons or electrons, which are the heat carriers in opaque solids. Recent experimental results [R. M. Costescu, et al, "Ultra-Low Thermal Conductivity in $W/Al_2O_3$ Nanolaminates, *Science* 303, 989 (2004)] with $W/Al_2O_3$ nano-laminates, having <60 pairs of layers, provides a confirmation of the above point of view, with thermal conductivity of k=0.6 W/mK measured. This result compares very well with thermal conduction of strongly disordered crystalline oxides that are in the range of 1 to 3, but significantly higher than powdered MgO (k=0.04) or silica-based carbon-added Aerogels (k=0.02).

Presently, despite their attractive properties for impeding energy flow, from the point of view of industrial and commercial applications, nano-laminates have some very serious drawbacks. That is, to manufacture these materials currently requires very expensive equipment, very clean conditions, and high vacuum, as the laminates are essentially built-up one atom at a time. To date, these materials have been fabricated utilizing magnetron sputtering or atomic layer deposition (ALD). Nano-laminates manufactured by these techniques usually have strongly-attached coherent interfaces, because of the perfection of the deposition and atomic uniformity of the interface. However, the size of samples made of these materials is limited, and the cost to make commercial products with these techniques is prohibitive with the state-of-the art techniques.

The desired degree of coherency at each interface depends on the application. As stated above, laminate materials usually inhibit propagation of the energy or matter in the direction perpendicular to the layers, while dissipating this energy or matter along the surface of the interfaces. Thus, to inhibit the propagation of energy, such as thermal energy or crack propagation perpendicular to the interfaces, it is desirable to have an incoherent interface between the layers of the laminate because coherent interfaces do not effectively scatter the energy perpendicular to them, alternatively, in many optical, electronic, and semiconductor-type applications, where electronic mobility or other transport properties must be optimized—highly coherent interfaces, without any dislocations, are a must.

Because of the high cost, nano-laminates are mainly used in high-tech-type industries, where the price of the product justifies the expense of making a material at the 'breathtaking' rate of 1 micron/hour. The fabrication methods currently used for making nano-laminates cannot be scaled-up to industrially meaningful dimensions because they are inherently prohibitively expensive.

Thus, a need exists for an industrially-scalable batch or continuous techniques to produce low-cost nanolaminates at a cost of at least an order of magnitude and preferably at least two orders of magnitude lower than is currently possible with the state-of-the-art techniques. In addition, a need also exists to be able to produce nanolaminates of much larger dimensions, such as higher areas. That is, a need exists for a process that is able to fabricate a low porosity nanolaminate material, in which each interface has a cross-sectional area of at least 0.1 square meter, preferably 1 square meter, and most preferably 10 square meters. The instant invention achieves the goal of providing an industrially-scalable methodology for fabricating large-area parts from nanolayered materials, which are already known in scientific research. Moreover, in the process of developing this methodology, these inventors have discovered a new class of nano-layered materials, termed IDnL, which cover the range of layer thickness between ordinary laminates and superlattices, as outlined above. These new materials have micro- and nanostructure which is very different from that of the two classes of laminated materials discussed above. Because these materials are fabricated from powders, which are eventually densified via rapid sintering, hot rolling, dynamic compaction, and such, the new materials have properties different from that of the already known laminated materials.

There are a lot of approaches, methods, and techniques that have been employed for making metal and ceramic laminates. The simplest approaches produce layers at least 100 microns in thickness and involve placing one layer on top of the other, which can be done by dipping in or painting wet slurries as well as by utilizing tapes. Other techniques that are able to deposit layer by layer, one after another, utilize chemical, physical, mechanical, explosive, or high-voltage approaches to deposit material on surfaces. Techniques that can produce micron-thick layers include ink-jet printing, silk-screen printing, plasma spraying, and the use of a Meyer bar or a Doctor blade. The thinnest nanometer-thick layers require the use of techniques, such as, chemical vapor deposition, physical vapor deposition, atomic layer deposition, electro-deposition, as well as magnetically and electrostatically-assisted sputtering in which layers are built-up one atom at a time. Other techniques, such as electrophoresis have been used to deposit ceramic nano-laminates from aqueous suspensions. All of the above nanometer layer techniques are expensive and inherently very slow not only because of the low rate of deposition but also because of the need to move the substrate between deposition stations or to change the precursor between layer depositions, as well as to allow the previous layer to dry or cure before the next layer can be applied. These techniques are more applicable to fabricating layered coatings. Considering the size of the required vacuum chambers and the cumbersomeness of each of these techniques, it would be prohibitively expensive to fabricate bulk parts with at least a square meter in area and 100,000 layers in thickness.

A few methods to make bulk nano-layered materials do exist, however. One such method is used in manufacturing exfoliated graphite, vermiculate, and mica-type thermal insulation. This method utilizes the natural property of these materials to form flakes. The individual flakes whose area varies from sub-micron to hundreds of millimeters are dispersed in a liquid. When the liquid is removed by evaporation, the flakes settle and form a nano-layered material. However, the individual layers in such structures are not continuous or uniform and the thickness cannot be easily controlled. In addition, it is impossible to make multi-component nano-layered materials, i.e. nano-laminates with adjacent layers having different composition or structure, with a nanometer layer thickness employing this technique.

A multiple extrusion step approach has been utilized in the electronics industry for more than 50 years to make nanometer thick layers in Channeltron photo-multiplier tubes. In this process, sacrificial glass rods coated with a different glass are bundled together in a hexagonal array and drawn down to a very small diameter through many drawing steps. After the sacrificial glass is removed, micron sized holes separated by nanometer thick walls formed by the coating remain. A similar process is currently used in superconductor wire processing to make fibers that consist of large number of closely packed cores. In this case, ceramic superconductor wires are assembled in a closely-packed bunch within a copper outer tube and then extruded to ever smaller diameter tubes to make thin wires that consist of thousands of thin electrically-isolated superconducting wires. These approaches are conceptually similar to the current invention, however these approach are directed towards making single layer 1-dimentional structures—tubes and wires—not 2-dimensional multi-layered bulk materials.

To summarize, there are no approaches that exist in the current state of the art for making large quantities of high surface area nano-laminates with thousands of continuous nanometer thick layers of different metals and ceramics with unbroken interfaces. Not only can the instant invention achieve this goal but it can do so in an economical, industrially-scalable manner.

SUMMARY OF THE INVENTION

This invention describes a unique class of ceramic and/or metallic environmental energy barrier materials for use as protective coatings or barriers against heat as well as material loss due to processes such as corrosion, abrasion, wear, ablation, erosion, or oxidation.

These nanoscale materials consist of a very large number of essentially parallel nano-layers with adjacent layers having a different composition or structure. The interfaces between these nano-layers are engineered in such a way as to impede the progress through the material of whatever external thermal, mechanical, or chemical energy that impinges on its surface. The sheer density of such interfaces, in the hundreds of thousands per centimeter of thickness of the material, creates novel, highly-desirable properties to this nano-layered material, such as unique resistance to propagation of heat, fracture, or environmental attack.

In contrast to many nano-laminates, the properties of these materials are controlled by the engineered interfaces and not by the material used to fabricate the layers themselves. Thus, an additional benefit to this technology is that the materials used to fabricate the layers do not have to contribute to blocking the energy flow through the material and can thus be chosen to maximize another property of the material.

In addition to these unique materials themselves, this invention describes the novel fabrication methods and techniques needed to fabricate large surface area bulk structures in an economical, industrially-scalable manner. Taking the idea from the ancient method of the forging of steel utilized in making of Japanese Swords, this invention uses a number of sequential steps to raise the number of layers to $2^n$—with "n" being the number of processing steps. Since $2^n$ increases exponentially, after just n=17 steps, the number of layers is 131,072 per centimeter of thickness with the thickness of an individual layer of the order of 100 nm. The steps of this process include among others the layering of different materials followed by the rolling or pressing of the composite stacked material to decrease its thickness. Subsequently, the compressed composite material is either folded on itself or is sectioned and then the sectioned pieces are stacked on one another.

Forging a monolithic material, like steel, requires that the material deform plastically at the processing temperature. Unfortunately, most ceramic materials and many metals are much too hard and brittle, even at very high temperatures (500-1200° C.) to allow such processing. In other words—they do not deform plastically, making forging impossible.

The instant invention circumvents this problem by starting with powders instead of monoliths. The steps of this process include among others the layering of the pastes made from powders of different starting materials, followed by the rolling or pressing of the composite made of the stacked pastes (called greenware) to decrease its thickness. Subsequently, prior to sintering, the compressed greenware of the composite material is either folded on itself or is sectioned and then the sectioned pieces are stacked on one another. In the final step, the prepared greenware is densified either by rapid sintering, or, preferably, via rapid hot pressing, dynamic compaction, or hot rolling. The degree of coherency of the interfaces in the thus-fabricated nanolaminate is greatly affected by the final densification procedure, with temperature, pressure, and the time at temperature being the key processing parameters.

An additional concept of this invention is the unprecedented capability to incorporate additives into the engineered interfaces. During the green-ware processing steps, the outside surfaces can be coated with liquids or powders, or other pastes can be added, which, in turn, are incorporated into the bulk of the material. Thus, a whole variety of graded materials and sequences of different layers can be designed and formed in a very economical and industrially scalable manner. For example, a single material can consist of a sequence of heat-, fracture-, and oxidation-impeding layers. And all of this can be achieved in a very economical and industrially scalable way.

The nano-laminate barrier approach of the present invention is very different from the macroscopic layered approach of the prior art. This approach can effectively replace materials of the prior art in many different fields. Thus, the materials of this invention have broad application in a variety of different forms and may have a broad range of different compositions that depend on the specific application. As a result, for the purposes of this invention the term "environmental energy barrier material" will be used as an all-encompassing term to describe not only what is being resisted, such as chemical attack (i.e. oxidation or corrosion), heat conduction, or material removal by physical processes (i.e. abrasion, wear, erosion, ablation) but also how the material is being used (i.e. physical barrier, coating, or monolithic structure). In addition, the terms nano, nanoscopic, nanophase, nanoscale, nanosize, and nanostructured will be used interchangeably.

By incorporating electrostrictive or magnetic particles or layers, these novel materials can be made 'smart' and allow electronic manipulation of the above properties. By using single crystal seed particles, the different neighboring layers can be converted into 2-dimensional single crystals, by a crystal-growth method. Thus, the material can be made into radiation-filtering device, in which some wavelengths are filtered out, or focused in selected directions in a manner similar to X-ray diffraction. This property can be made tunable by placing a smart material in alternative layers or non-sequential layers.

DETAILED DESCRIPTION OF THE INVENTION

The instant invention describes Interface-Defined Nanolaminates, which are new and novel materials fabricated principally from metals and ceramics. The crux of this invention is to utilize the properties of interfaces, rather than the properties of the constituent materials within the layers of a nanolaminated material. This is similar to the use of nano-particles rather than traditional micron-sized particles in the fabrication of sintered metallic and ceramic parts. That is, as particles that are compacted and sintered into a monolithic body become smaller, the percentage of atoms that reside in the grain boundaries increases affecting the bulk properties of the body. In a similar manner, in the present invention, as the layers become thinner and more numerous, the influence of the interfaces eventually over-shadows the influence of the material in the individual nano-layers.

Interface-Defined nano-Laminates (IDnL) are materials which consist of at least 100, preferably more than 1000 and most preferably more than 100,000 continuous parallel layer planes of micron or preferably sub-micron thickness in which the adjacent layers have a different composition and/or structure. The individual layers are less than 5 microns thick, preferably less than 500 nm thick, and most preferably less than 100 nm thick.

The property-controlling parameters in these materials are the properties of the continuous essentially linear interfaces and the density of interfaces per unit of length through the thickness. IDnLs are designed by first deciding on the properties desired for an interface and the density of such interfaces, and only then selecting the appropriate materials to achieve such properties. Knowing the properties of this interface, the required density of such interfaces can be determined, and then a material fabricated.

This invention also describes a process for the manufacture of these nano-laminates. These laminates with a very large number of thin laminate layers have not existed in quantity previously because there has not been an economical process that is able to fabricate them in large quantities with large surface areas. The solution to this manufacturing problem was found by looking at historical methods for insights.

Since ancient times, Japanese samurai swords have been prized for their superior qualities in terms of hardness/toughness combination, which is expressed as the capability to cut through other swords, while at the same time being capable of bending into a circle. The remarkable processing technique that yields hundreds of thousands of iron carbide layers, parallel to the surface of the sword is responsible for these remarkable properties. The procedure consists of starting with a single slab of iron, carbonizing its surface, than cutting it in the middle, folding one piece on top of the other, and hammering everything back into the starting shape. When this procedure is repeated n times, it creates 2 to the n power of layers. If n=17, there are about 130,000 layers in a 1 cm-thick sword. By definition, the material of the sword is a nano-laminate with thickness of laminates of ~100 nm. The current invention takes the ancient multi-step process of sword-making to a new level to produce a novel family of materials—Interface-Defined-Nano-Laminates (IDNL), as described herein. Although the idea for the process to fabricate the IDnL materials was inspired by the method for making Samurai swords, the exact procedure and the processing steps are not obvious to those skilled in the art of sword making. Moreover, whereas the Japanese sword making technique requires working with one material—steel, and carbonizing the surface of that steel, the novel method that is the subject of this invention deals principally with ceramic and metallic powders in the form of pastes with a viscosity capable of plastic deformation without losing the continuity and integrity of each individual layer. Even more important, the approach of the instant invention is able to work with more than two materials, actually the processing can be carried out with two, three—any number of pastes of different powders, and includes the ability to incorporate additional pastes and surface coatings at any step in the processing procedure. These features make this invention distinct, very versatile, and not obvious to either those skilled in the art of making Japanese swords, or those skilled in the art of ceramic powder technology or powder metallurgy. (Actually, the processing steps of this invention are more akin to those involved in making fine French croissants and German pastry, as more and more ingredients are incorporated by a skillful cook during the folding procedure.)

The procedures described in this invention offer remarkable flexibility in the design of nanolaminates of very complex structures, which may incorporate ceramics, metals, semiconductors and polymers to achieve the goals of the mechanical, physical, and chemical properties. The general steps in this procedure are given in Example 1 below.

Example 1

A) Modeling

The first step in the process of fabricating an IDnL material is to make the decision on the type of interface properties this material should have. For example, if the projected material is a thermal insulator intended for exploitation at very high temperatures, the properties of the interfaces must include thermodynamic stability, or at least kinetic stability for specified duration at service temperatures. All mechanisms of heat transport must be taken into consideration: in this case phononic and photonic, and the reflection and transmission coefficients at the designed interfaces evaluated. Also, some estimates of the degree of coherency should be performed. After this $1^{st}$ step, the composition of the materials in the layers, the exact sequence of the dissimilar layers, the structure and chemistry of the interfaces, the thickness of each type of the alternating layers in the direction perpendicular to the plane of the layers, the density of layers per unit of thickness of the laminate, and many other parameters characterizing the exact structure of the nanolaminate material must be determined.

One parameter that is not as important in the design of IDnL materials as in laminated materials with much thicker layers is the matching of the thermal expansion coefficients of the various constituents. This is due to the fact that the nano-layers are so thin that their thermal expansion produces little stress. All of the above is achieved via extensive computer modeling, and experimental studies of selected interfaces in bi-material junctions.

The remarkable flexibility of the approach and the sheer number of adjustable parameters makes it imperative that the material should be designed and modeled thoroughly prior to the actual fabrication. The IDnL materials are a new class of materials—these are "Materials—Structures" (rather than structural materials) and that's why intelligent engineering design of these materials-structures is so imperative. These IDnL materials can be thought of as the next step up from individual materials. Although they are not yet engineering structures that require the classical structural analysis, they are much too complex to be designed just on the hunch that normally guides a materials scientist when selecting a composition and microstructure needed to achieve some desired properties. The classic intuitive guess approach simply will not work in the case of IDnL materials—only a thorough computer-assisted design of the interface atomic and microscopic structure and interfacial properties, as well as thermodynamic and kinetic stability will achieve this goal.

B) Constituents

The next step involves preparation of pastes consisting of nanosize particles of the materials selected in the previous step: metals, and/or ceramics, or others. Each paste that will ultimately form a nanolaminate layer, may comprise nanopowders selected from the group consisting of, metals, ceramics, alloys, semiconductors, polymers or a mixture of these constituents. Although, laminates can be fabricated with particles in the micron and tens of micron range, for the instant invention it is desired to use particles of preferably less than 500 nm and most preferable less than 100 nanometers in size. The particle size is selected in such a way as to give continuity to the ultimate layer thickness formed by these particles. That is, the particles must be substantially (at least 3 times and preferably at least 10 times) smaller than the ultimate thickness of the resulting layer formed by these particles. If the particles are agglomerated, the agglomerates must first be broken up by an appropriate technique, such as wet or dry grinding, attriting, milling, sonication, etc.

Some pastes or slurries can be made with an aqueous base, while other may require an organic or oil-base. If immiscible solvents are utilized for the different layers, this assures non-wetting characteristics during the forming process. Other non-wetting systems can be used as well. In addition to the solvent and the nano-particles, the paste or slurry may also contain a binder, lubricants, and other additives as required, such as, dispersing agents and plasticizers as needed. The additives are adjusted by means well know in the art, such as the use of the Zeta Potential, so that the particles remain well dispersed in the solvent.

The viscosity is adjusted with the solvent for the required application. For application procedures, such as ink-jet deposition, silk screen printing, spraying, or use of a doctor blade, the viscosity must be low enough to spray or spread evenly. Using pressing or rolling procedures, the required initial viscosity of the pastes is a function of the rate and extent of deformation, as well as of the processing temperature, and other important parameters. It is characterized and adjusted to stay within the region that satisfies the continuity requirement for the layers after the last step, which could be n=17, or close to it. It is important that it be possible to roll or press the paste without deforming it in a manner that intermixes the individual layers.

An interface additive material is a substance that is added to the surface of one or more of the at least two laminate layers that form the laminate. It can be added at any step of the laminate forming process and can have any thickness required for the properties of the laminate. That is, it can be thinner or thicker than the thickness of the at least two laminate layers. It can function as either an interface modifier or as an additional layer material between the other layer materials. Most additives are in the form of liquids, suspensions, emulsions, or pastes and are selected from the group comprising metals, ceramics, alloys, and polymers.

C) Procedure—Rolling and Pressing of Pastes

For rolling or pressing, two or more different pastes of the appropriate viscosity (similar to modeling clay) are placed in the starting sequence of layers. The thickness of the at least two different layers usually are but need not be equal to each other. The individual thickness and number of each type of layer in the starting stacked assembly depends upon the application. It is preferable that the total thickness of all the starting layers be equal the total thickness of the desired product, although this also is not necessary. The assembled layers are then deformed and compressed by pressing or 1-dimensional rolling, for example, to decrease the thickness of the composite layer assembly while assuring that the layers remain parallel to each other. The final thickness after compression is usually one-half of the original thickness, although it can be more or less than this value. The green laminate or nanolaminate is then preferably cut in the middle and the resulting pieces are placed on top of each other in an orientation to insure that dissimilar layers are in contact with one another. It should be noted that the assembled layers can also be cut into three or more pieces of equal area that are subsequently stacked in the same manner. Alternatively, the assembled layers can be folded back on themselves. This is usually not as desirable as cutting because it is not possible to retain the sequence of dissimilar layers with folding. The deformation is then repeated. The ultimate number of the repeated sequences of, deforming, cutting, and stacking depends on the structure that is being developed. Each step usually doubles the density of layers in the same original thickness. At each step, additives can be added to the exposed surface of the green laminate or nanolaminate to enhance or control properties. Thus, a non-wetting additive layer could be added between layers that wet each other to keep the interfaces distinct during processing or the additive could enhance some property of the final laminate. The additives can be added by techniques, such as, brushing, spraying, Doctor blade, or Meyer bar and their thickness can be greater, equal, or less than those of the at least two different laminate layer materials. The thickness of the additive layer relative to the thickness of the at least two types of individual layers is determined by the thickness of the applied additive layer as well as by the thickness of the at least two different layers in the layered structure at the time when the additive layer is applied.

Prior to sintering, all ingredients but the particles must be evaporated away or burned-out. This is a normal step in the processing of powdered ceramic and metallic materials and involves the removal of the binders, lubricants, plasticizers, and other organic additives. De-watering and de-gassing the green nanolaminates, prior to sintering or pressure-assisted consolidation, to remove all the volatile components is accomplished by using a variety of methodologies well-known to those skillful in the art of powder metallurgy or ceramic processing. These may entail controlled-rate heating and holding procedures utilizing long intervals under vacuum. The exact temperature/vacuum/holding time conditions depend on the properties of the volatile components, the particle size of the starting nanopowders, and the amount of porosity acceptable in the final product.

After this step the green laminate or nanolaminate is sintered in such a way as to achieve uniformity and continuity of the structure, while at the same time controlling the grain growth. This final stage of nanolaminate fabrication consists of one or more of the techniques of reaction sintering, hot-pressing, hot rolling, dynamic compaction, liquid infiltration, or other densification method well-known in the art of sintering of metals and ceramics individually or in sequence, intended to yield fully-dense materials within the layers with various degree of coherency at the interfaces. The degree of coherency at the interfaces in the final consolidated nano-laminates could be affected greatly by the processing temperatures. A post-consolidation heat treatment—a post-sintering step—may be added for some nano-laminates to develop the desired degree of coherency at the interfaces and to reduce or completely anneal out, (if so desired), stresses arising from the difference in thermal expansion coefficients of the materials comprising various layers in nano-laminate (for some applications, such remnant interlayer stresses could be an advantage—arresting the tips of the propagating cracks.)

During this densification, most applications require minimizing grain growth of the two or more of different nano-materials comprising the individual layers in the nano-laminates. Thus, sintering must occur rapidly at as low a temperature as possible in order to avoid grain growth of the nano-sized powders. Densification during sintering may be aided by hot isostatic pressing. It is desired that the final density of the part equal 95% and preferably 98% of the theoretical density of the material which is the density of the material without pores. This density is conventionally calculated using the unit cell volume, the material's chemical formula, and the number of formula units per unit cell. Thus, the porosity should be <5% and preferably <1%.

D) Alternative Procedure—Spraying

For this procedure the modeling requirement and the constituents can be the same as in rolling or pressing procedure. However, instead of starting with pastes, it is possible to start with lower viscosity slurries containing the same ingredients but having a higher concentration of solvent. This lower viscosity material can be utilized in other methods such as spraying, inkjet printing, and silk screen printing that are unable to produce the continuous nanometer thick layers that are required for this technique. In this procedure, techniques such as these can be used to produce micro-laminates, which have multiple layers (10-100,000 for example) of 100-10,000 nm thick individual layers of material. These micro-laminates are formed by spraying or spreading individual layers of material on a substrate one at a time. The process utilizes in a successive, sequential deposition technique so that adjacent layers are comprised of different materials. Each repeated pass over the substrate with materials different from the previous layer is preceded by at least a partial drying step before the deposition of the next individual layer. This drying step is needed to prevent the inter-mixing of adjacent layers and is accomplished from the deposition side and/or the substrate side. After the desired total micro-laminate thickness is achieved, it can then be removed from the substrate and then stacked on other micro-laminates, re-solvated to a paste like consistency, and then pressed or rolled to the final individual laminate layer thickness of less than 1 micron through single or multiple steps as described in the rolling and pressing procedure. The remaining steps are the same as in the rolling and pressing procedure. If the micro-laminates are stacked, prior to the stacking of the micro-laminates, interface additives can be added to the surface or the surface layer might be converted by a process such as oxidation, carbidization, nitridization, or boridization.

Heat Flow in IDNL

In many other applications, such as in jet engine turbines, the components need to be protected from heat. In this example this protection is necessary because there is a constant desire to increase engine temperatures in order that the engine can operate at a higher thermodynamic efficiently and thus conserve fuel. Thermal barrier coatings have been in use for some time to deal with this problem of components operating in high temperature environments where their mechanical strength is severely degraded. These coatings allow the cooled mechanical part to be at a temperature significantly lower than the environment inside the engine and thus maintain the required mechanical properties. As in the case of the high temperature oxidation resistant coatings, although there has been good success with thermal barrier coatings, there is still a need for materials with lower thermal conductivity and greater oxidation resistance.

The process of energy transfer in the Interface-Defined Nano-Laminate materials has certain peculiarities that make it quite different from that in ordinary materials. That is, the process is entirely controlled by the properties of interfaces and by the enormous number of said interfaces per unit length in the perpendicular direction to the area of the interfaces.

In general, thermal energy transport through a solid is carried out via three basic processes: conduction, convection, and radiation. In the following discussion, convection is disregarded, because IDnLs are basically solid materials with very little, if any, open space within them—thus thermal motion of liquids or gasses in those spaces is totally insignificant in the process of energy flow.

On the other hand, the two other mechanisms of energy flow are very important. In true IDnL materials, which will be defined below, the flow of energy is dependent only on the properties of the interfaces. Thus, the heat-conducting properties of materials that constitute the layer planes become inconsequential as the number of said planes increases. This makes IDnLs somewhat similar to reflective thermally-insulating materials, although, the process of energy reflection in IDnLs relates not only to the radiation carried by photons, as in ordinary reflective insulation, but also to the thermal flow carried by phonons in ceramics or electron conduction in metals, as in ordinary thermally-resistive insulation. The abrupt, discontinuous, interfaces in IDnL materials can be designed in such a way that both photon reflective properties and phonon-scattering properties are optimized, which makes the IDnL-type materials inherently superior heat insulators, especially at extreme temperatures, where the radiative heat transport can become the dominant process of energy flow.

The following discussion is intended to give some pertinent fundamentals of the two processes of thermal energy transport and give general guidelines for the design of IDnL thermal insulation.

In any material, heat flux between two surfaces due to conduction is described by:

$$f = U(T_a - T_b) \quad (1)$$

where:
  f—heat flux ≡q/A (rate of heat flow/area) [W/sec m$^2$];
  U—heat transfer coefficient;
  $T_{a,b}$—surface temperatures;
In the absence of internal barriers, U is simply equal to k/L, where k is thermal conductivity of the material of the surfaces, and L is the distance between them.

However, when there are multiple surfaces present between the two surfaces, the equation for U becomes more complex:

$$U = \left( \sum_1^n R_i + \sum_1^n \frac{L_i}{k_i} \right)^{-1} \quad (2)$$

where: $R_i$ is the heat transfer resistance at each interface.

As n—the number of layers—increases, the first sum, the sum of $R_i$'s, also increases in direct proportion to n, whereas the second term essentially remains constant and even slightly decreases due to the overall decrease of the total thickness of the material (a small change); thus, at some large n, the second term can be disregarded and the heat transfer coefficient becomes simply:

$$U = \left( \sum_1^n R_i \right)^{-1} \quad (3)$$

Equation (3) can be used as a working definition of a true IDnL material. It simply states that when the sum of Rt's—the heat transfer resistances at interfaces is much greater than the sum of $L_i/k_i$'s—the resistances to heat flow via conduction within the layers, the total IDnL material's resistance to conducting heat flow is due entirely to the resistances at the interfaces, whereas the thermal conductivity of the material of the planes is irrelevant.

Radiative Transport in IDNLs

In addition to the process of thermal conduction, which is due to phonons and electrons (in metals), heat transport by radiation becomes very important at temperatures above 1,000° C. Here again, the properties of interfaces, and the large number of them, are the key controlling parameters in containing the flow of radiative energy and reflecting the photons back to the source.

In designing the thermal insulation, it is very important to differentiate between the absorptive and reflective properties of the interfaces, since these properties lead to very different phenomena and, consequently, to very different insulating properties. Designing the interfaces with high absorption is not enough to stop radiation, as is discussed below. It is essential also to have interfaces with high reflectivity, or coherent reflection of photons. If photons are only absorbed, then, according to the Kirchhoff's law, the same intensity as is being absorbed would be emitted, thus, an array of black body-type absorbers, provides only a temporary, transient barrier to incoming radiation. As the array heats up, the energy flow through it would become unimpeded. Thus, some degree of reflection, or coherent scattering of photons at the interfaces in IDnL is essential for building superior extreme-temperature insulation.

The radiative energy transport is governed by the Stefan-Boltzmann law:

$$W = \epsilon \cdot \sigma \cdot T^4 \tag{4}$$

where

W—emissive power [W/sec m$^2$];

—emissivity of the surface (E=1 for Black Body or BB, E<1 all others);

T—temperature of the surface;

—Stefan-Boltzmann constant.

If the interfaces in IDnLs are made of a 'black body'-type material, such as powdered carbon, for example, —the emissivity of such interfaces would be very close to one ($\epsilon_c = 1$). Such interfaces would form an array of black body absorbers and, unless they are aggressively cooled, would provide only small resistance to flow of heat, just the transient one, while the material is heating up. After a brief transient period, as one interface after another would reach the same temperature as the source—due to the absorption equal to unity—such an array of absorbers would provide virtually no impediment to radiative transfer of heat, because the radiative energy transport between each interface would be the same—given by the equation (4).

However, if $\epsilon < 1$, even just slightly less than one, then the temperature of each subsequent interface would be slightly less than the one in front of it. The temperature of the interfaces in this case can be approximated (neglecting multiple reflections), by the following equation:

$$T_n = \sqrt[4]{\frac{\varepsilon^n \cdot W_0}{\sigma}} \tag{5}$$

Equation (5) simply illustrates that in an array of absorbing interfaces, which have absorbtivity and emissivity different from unity, the temperature of such interfaces goes down as the distance of the interface from the source increases. With higher emissivity, the decline is more gradual. Since emissivity of most materials, except highly-polished metals, like silver or aluminum, is very close to 1, it takes a very large n to achieve a significant decrease in the temperature of the interfaces. This is exactly where the IDnL approach becomes very powerful! By having virtually unlimited number of interfaces, even weakly-reflective, (yet highly refractory, thermally-stable, and mechanically strong) interfaces can act as excellent reflectors of radiation due to their multitude.

Of course, the thermal conduction process cannot be ignored, as well. So, in ordinary thermal insulation, it is always a balancing act between mechanical strength of the insulation and its heat conduction, but not in IDnL materials. These materials by virtue of having an extremely large number of interfaces facing the heat flow with each interface reflecting at least some photons and phonons back to the source, can be designed to have both high mechanical strength and superior resistance to both radiative and conductive heat transfer. The IDnL approach is truly the best approach to fabricating strong, tough, light, oxidation-resistant, impact-resistant extreme-temperature insulation exactly because it does not require incorporating porosity and lowering density which makes the material mechanically weak in order to limit the conduction of heat. In addition, since it is primarily the interfaces in IDnL s and not the materials from which the layers are fabricated that dominate in the reduction of heat transfer, the type of materials from which the layers are fabricated can be changed from low thermal conductivity materials in order to enhance other properties of the nano-laminate insulator without significantly increasing the heat transfer.

Thus, one of the main advantages of the IDnL thermal insulating materials over any insulation that currently exists is that the IDnL material can be made very strong and tough mechanically, as well as very thin, and have superior thermal insulation properties at extreme temperatures. In fact, the higher the temperatures, the more clearly the advantages of IDnL insulation over the conventional particulate, or fiber-based insulation should be.

IDnLs as Oxidation and Erosion Barriers

For thermal protection at temperatures near and above 2000° C., many parameters have to be taken into consideration: blocking radiative energy flow, blocking phonon/electron heat conduction, as well as maintaining phase stability in addition to impact and oxidation resistance—just to name a few. The IDnL approach offers unprecedented flexibility and capability in designing the nano-structured 2-dimensional material/structure to satisfy all of the above the requirements.

In the prior art, barrier materials used to protect components and devices at high temperatures have usually consisted of one or more layers of material comprised of uncoated grains or particles of at least one micron to 10's of microns in size. The materials in these one or more layers were chosen on the basis of the properties required by the particular application. These properties might include their compatibility with the component or device to be protected, thermal expansion coefficient, thermal conductivity, resistance to oxidation, resistance to corrosion, electrical resistivity, melting point, compatibility with other barrier layer materials, resistance to particle impingement, etc.

These layers of material, usually tens to hundreds of microns thick, have been applied sequentially. Their composition has either been constant or has been varied through the layer thickness. In some cases there was interaction between layers at the interfaces to slow the attack from the environment. What is common to the prior art is that each component barrier material is usually single layered, with each layer serving a function. When these barrier layers are exposed to a hostile environment such as chemical reaction or particle impingement, one layer is attacked at a time, commencing with the outermost layer. During this attack, individual grains can be removed, material in the barrier can become porous due to reaction, and reactive fluids can travel through the layers along the grain boundaries. If the attack is continued, at least a portion of all layers will ultimately be breached.

The instant invention takes a different approach to forming an environmental barrier material. Thus, instead of utilizing several macroscopic layers of material that are microns to millimeters in thickness comprised of grains that are usually one to tens of microns in size, all dimensions are decreased to the nanometer scale. That is, the environmental energy barrier material comprises hundreds, thousands, or preferably tens of thousands of layers of each material that are from 1-1000 nm and preferably from 1-100 nm in thickness.

Thus, in contrast to the thick glass layer of the prior art, a very thin layer of glass formed by oxidation of a glass-forming nanolayer would be able to flow seal any cracks even with a high velocity flow over the surface of the coating or monolithic component. In the case of oxygen attack, this glass would form and seal all grain boundaries where oxygen traveled. The result is many thin layers of glass throughout the barrier material. In contrast to a thick conventional single layer of glass on the external surface of a conventional barrier coating, the glass sealant of the instant invention would exist in hundreds or thousands of layers throughout the IDnL and would thus have greatly increased surface area.

It is well known in material science that the properties of materials are tailored not just by their composition, but also by the means and sequence used to combine the constituents of the material or place them in contact with one another. In the instant invention, the increased effectiveness of the environmental barrier material is not due to using different chemical compounds than used in the prior art to fabricate a barrier material. Rather, the increased effectiveness is due to how the various chemical compounds are placed in intimate contact with one another in the proper manner, form or sequence.

Generally speaking, oxidation is a complex thermo-physical process that involves diffusion of oxygen to a surface, diffusion of oxygen into the material, and a chemical reaction of oxygen with the material being oxidized. Oxygen diffuses down the chemical potential gradient and in the process, in some systems, oxygen might form stable phases. Diffusion through these stable phases can be very slow and in some cases can be the rate-controlling parameter in the oxidation process. Parabolic dependence of thickness of the oxidized layer on time is frequently observed.

As stated above, in an environmental attack such as oxidation, it is the properties of the interfaces and the density of interfaces that's controlling the resistance to the advancing front of the reactant—not the material within the layers. For example, a very high density of extremely thin oxide interfaces might be all that's needed to stop oxygen propagation, rather than a thick coating, as long as these barriers are continuous and defect-free. Another way of saying this: most of the benefit of utilizing an oxidation-resistant coating comes from the first few atomic layers—the rest is much less effective. If one keeps repeating only those effective layers—much less material is needed to be an effective a barrier to oxidation.

In regard to erosion behavior, a very important parameter in predicting erosion resistance is the roughness of the oxidized interface. In materials that are highly susceptible to oxidation, and at high temperatures, the diffusing interface is expected to be very rough. In such a material, oxidation rapidly proceeds along the grain boundaries, dislocation cores, manufacturing defects and other imperfections that provide fresh unoxidized surfaces for oxygen reaction and diffusion.

When such a rough interface of the prior art is exposed to an erosive or ablative environment (i.e. with or without particles) of rapidly moving gas contacting the surface, large particles of unoxidized material surrounded by oxidized material are torn away, which leads to a catastrophically rapid rate of recession. Thus, a rough oxidation interface inevitably leads to very rapid rates of oxidation and erosion. When an oxidation protective coating is not compromised, there is little oxygen transport across the coating and the material underneath is essentially intact, or shows a mild parabolic rate of oxidation. However, the smallest defect, such as a crack in the coating due to thermal shock or a pin-hole due to an impurity will expose the unprotected material to oxygen at high temperatures, which in turn leads to rapid oxidation and a rough interface. Accordingly, if the coating is compromised in any way, one expects to observe a rough interface in a part made of an oxidation-prone material surrounded by a thick coating.

In contrast, the Interface Defined Nano-Laminate approach to oxidation passivation of the instant invention offers greatly improved control over the roughness of the oxidation interface at all temperatures and oxygen pressures. It is based on the simple concept that if the individual laminate layers are hundreds of nanometers rather than tens or hundreds of microns in thickness, the roughness of the oxidized interface will be of the order hundreds of nanometers which is orders of magnitude smaller than coatings of the prior art. This results in greatly reduced roughness and a corresponding decrease in the ablation rate.

Because IDnL materials are able to comprise nano-, micro, and macro-structure, the nano-aspects of this structure must be designed to be stable at the temperature of use. The issue of thermodynamic stability of these nanostructures has been addressed, evaluated, and managed. That is, since the interfacial surface area of these structures is huge, from a naïve point of view it might be assumed that these structures are unstable. To eliminate any potential instability, the material components are selected based on their high-temperature stability and absence of any eutectics in the phase diagrams leading to the formation of liquid phases. In addition, the solid-state solubility is also controlled by pre-selecting the phases in such a way as to satisfy phase stability and co-existence rules of the thermodynamic phase diagrams that are known for the system. The interfaces should resist inter-diffusion, diffusion bonding, and other high-temperature events that could destroy the structure of an IDnL material. In some applications, grain growth within laminate layers might not be too important and in some cases is desired, depending on application. Although it is usually desirable to limit grain growth within the layers in order to take advantage of the nanophase materials, in certain applications it might be desirable to let the grains grow and to actually form single crystals within the layers.

In order to assure the stability of IDnL materials at high temperatures, both the stability of the nano-layers or planes and the phase stability must be addressed. Both of these issues are well-known in the field of Materials Science and the methods for assuring stability of these materials even at the most extreme temperatures are known to those skilled in the art of extreme-temperature-capable structural materials. Only three methods will be mentioned here for illustrative purposes. The material in the planes can be seeded with larger crystallites allowing subsequent crystallization to take place within individual layers which assures coarse grain structure within the planes. To further assure stability, the composition of adjacent layers should be chosen from immiscible areas of phase diagrams and diffusion inhibitors should be used at the interfaces.

Finally, in regard to stability, it should be noted that the artificially produced nano-laminate structures of the instant invention have a lot in common thermodynamically with spinodal structures found in nature. That is, these spinodal structures have similar nanostructural features and also have remarkable phase stability at high temperature. From this discussion, it should be clear that not all attractive material combinations could be used as particle substrates and coatings because of the thermodynamic stability requirement. The exact combination of the materials has to be deduced from corresponding phase diagrams to assure that the phases are stable at the temperatures required for service.

In fact, these artificially made nanostructures, if properly designed thermodynamically, should inherit a lot of stability features of spinodal structures, including thermal, chemical, and mechanical stability. It is known that spinodal structures greatly resist any kind of thermo-chemical changes because they are, at any given temperature, at equilibrium and thus stable. They are also highly resistant to crack nucleation and growth because, as all layered structures, they are susceptible to crack branching and crack-tip blunting. Accordingly, the consolidated coated-nanoparticle materials that are the subject of this invention are also expected to have significantly increased fracture toughness as represented in increased resistance to crack nucleation and crack propagation. All this should lead to greatly improved mechanical strength, flaw tolerance, and thermal shock resistance. In addition to the relatively straightforward geometric effects described above, the instant invention brings into play some powerful forces of thermodynamic equilibrium, which results in an additional drastic decrease of the oxidation rate in the nanoscale materials. Preliminary investigations suggesting that diffusion can be severely depressed in some nanoscale systems, such as hafnium carbide, have been published. See, e.g., C. B. Bargeron et al., J. Am. Ceram. Soc., 76 (1993) 1040-46.

Close examination of the SEM pictures of macroscopic layered interphase boundaries in $HfO_2/HfC_2-xO/HfC$ system shows remarkable uniformity of the interphase boundaries. This strongly suggests that the local thermodynamic equilibrium between the three phases acts as a stabilizing force preventing interface mobility and working against oxygen diffusion. By decreasing the particle size and nano-laminate layer thickness, this stabilizing force will increase and work more efficiently against oxygen diffusion. Thus, at the nanoscale, by utilizing oxidation resistant materials with thicknesses in the nanometer to hundreds of nanometer range, the driving force of the local thermodynamic equilibrium trying to maintain the ratio of phases derivable from the phase diagram will be drastically increased by the close proximity of the phases. This is a universal argument which applies to any other diffusion dependent process, such as corrosion.

The procedure which is described in this invention offers remarkable flexibility in the design of nano-laminates of very complex structures, which may incorporate ceramics, metals, polymers, and semiconductors among other materials. The fact that it is possible to adjust the composition and structure of the materials that will form the layers, the exact sequence of dissimilar layers, the structure, chemistry, and sequences of the interfaces, density of layers, and many other considerations about the exact structure of the nano-laminate material allow one to precisely tailor the mechanical and chemical properties of the nanolaminate. Utilizing only ceramic layers in the laminates it is possible to increase the mechanical reliability, work of fracture, and toughness of ceramics by making laminate layers with weak interfaces which provide crack deflection. The ability to incorporate metal along with ceramic layers further enhances strength and ductility. A combination of high hardness of the internal layers combined with the built-in weakness of the interfaces and specially-selected density of interfaces will provide impact-resistance.

Finally, it should be mentioned that there are two additional areas in which IDnLs are of value. That is, in addition to their ability to impede the propagation of energy through the nano-laminate, IDnL materials can also incorporate functional or smart properties. That is, due to their extreme flexibility in processing in which individual layer thickness and composition, as well as layer sequence can be controlled and varied, smart or functional layers can be inserted at will. For example, piezoelectric materials can be incorporated as layers. Metallic neighboring layers functioning as electrodes can achieve excellent coupling between the field and the active material. In addition, magnetic particulates, shaped as required, can form the layers, which under the action of an applied magnetic field, could drastically change the electrical and thermal conductivity of the IDNL material. In another application, the IDnL material can be made 'self-sensing' by incorporating into it a few layers that would detect the applied stress tensor, or structural damage.

Optical properties can be easily manipulated by a number of approaches, IDnL materials can be made transparent or opaque to a certain range of wavelengths by an application of an electromagnetic field. In addition, IDnL materials can be made into an optical filter device that filters only some wavelengths. The wavelength of visible light is about 500 nm. That distance can be easily built into the laminate to allow for diffraction and interference effects. One application of this would be the use of this material to focus radiation only at certain angles (like in X-ray diffraction.)

To this point the discussion has centered on the use of manufacturing techniques, principally folding or spraying followed by pressing or rolling, to produce IDnLs with very special properties that are determined by a vast number of interfaces. It is clear that the IDnL technique can produce new structures. Because these techniques employ simple processes to produce the initial green-ware plate, and subsequent rolling and/or pressing steps are also standard simple industrial processes, no large upfront capital expenditures are needed, and operating costs are low. The technique is also eminently scalable, further reducing costs. In addition, it should be noted, that with appropriate techniques, there is no limitation in the shape of the nano-laminate coatings or structures that can be produced by the various processes described.

The multiple rolling or pressing process utilized in the present patent produces thin layers of material that have advantages over thin layers of material produced as single layers. Since these layers are constrained in the multiple rolling process by another material and they are rolled or pressed multiple times, the thin layers should be more uniform in thickness and composition, have lower roughness, and larger grain size as they are constrained to grow in only two directions.

While this invention has been described with respect to embodiments of the invention, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A batch or continuous process for fabricating a low porosity nanolaminate environmental energy barrier material comprising continuous parallel individual layers of at least two different nano-materials in which the adjacent layers have a different composition, said individual layers being numerous enough and thin enough so that the properties of the nanolaminate are mainly determined by the unbroken interfaces between the adjacent individual layers and to a lesser degree by the properties of the materials comprising the individual layer; said process comprising the steps of:
   a) selecting the material composition of nanopowders for each type of layer, the exact sequence of the dissimilar layers, the structure and chemistry of the interfaces, as well as the thickness of each type of the layers in the direction perpendicular to the plane of the layers as a result of a computer-assisted design of the interface atomic and microscopic structure and interfacial properties, as well as thermodynamic and kinetic stability;
   b) selecting and refining the nanopowders so that the particle size is at least 3-10 times smaller than the final layer thickness;
   c) forming at least two pastes or two slurries with different nanopowders by adding a solvent and at least one additive selected from the group consisting of a binder, a lubricant, a dispersing agent, a stabilizer, and a plasticizer;
   d) adjusting the viscosity of the slurries and the pastes;
   e) forming a green nanolaminate from the pastes or slurries by a process selected from the group consisting of spraying, rolling and pressing;
   f) de-watering and de-gassing the green nanolaminate, prior to sintering or pressure-assisted consolidation, to remove all the volatile components; and
   g) densifying the green nanolaminate to at least 95% of theoretical density utilizing one or more techniques selected from the group consisting of rapid sintering, hot pressing, dynamic compaction, and hot rolling applied while, at the same time, minimizing grain growth of the two or more different nanomaterials comprising the individual layers in said nanolaminates;
   wherein each of said individual layers in the nanolaminates are 1-1000 nanometers in thickness;
   the porosity of the low porosity nanolaminate environmental energy barrier materials is less than 5%;
   and wherein the interfaces between the layers control the properties of the low porosity nanolaminate environmental energy barrier material.

2. A batch or continuous process for fabricating a low porosity nanolaminate material of claim 1 in which the individual layers are 1-100 nanometers in thickness.

3. A batch or continuous process for fabricating a low porosity nanolaminate material of claim 1 in which there are at least 100 individual layers.

4. A batch or continuous process for fabricating a low porosity nanolaminate material of claim 1, in which at least two low viscosity slurries are formed from at least two different nanopowders, the low viscosity slurries having a viscosity low enough to be sprayed.

5. A batch or continuous process for fabricating a low porosity nanolaminate material of claim 4, in which each said low viscosity slurry formed from said nanopowder is sprayed on a substrate until the desired thickness for each layer is obtained.

6. A batch or continuous process for fabricating a low porosity nanolaminate material of claim 4, in which said low viscosity slurries formed from said nanopowders are sprayed in a successive, sequential deposition manner so that adjacent layers are comprised of different materials.

7. A batch or continuous process for fabricating a low porosity nanolaminate material of claim 4, in which said low viscosity slurries formed from said nanopowders are allowed to dry as necessary before the next layer is applied so that intermixing of adjacent layers does not occur.

8. A batch or continuous process for fabricating a low porosity nanolaminate material of claim 4, in which the spraying process is repeated until the desired number of stacked layers is achieved.

9. A batch or continuous process for fabricating a low porosity nanolaminate material of claim 8 in which moisture content of the stacked layers is adjusted in order that it can be subsequently pressed or rolled to decrease the layer thickness.

10. A batch or continuous process for fabricating a low porosity nanolaminate material of claim 8 in which the stacked layers are placed on top of each other.

11. A batch or continuous process for fabricating a low porosity nanolaminate material of claim 10 in which the stacked layers are pressed or rolled to achieve the desired layer thickness.

12. A batch or continuous process for fabricating a low porosity nanolaminate material of claim 1, in which the paste formed from the nanopowders has a viscosity that allows it to be rolled or pressed without deforming in a manner that intermixes the individual layers.

13. A batch or continuous process for fabricating a low porosity nanolaminate material of claim 12, in which an individual layer of one paste formed from one nanopowder is initially stacked on at least one individual layer of paste formed from at least one other nanopowder; the total thickness of the individual layers being equal to the desired thickness of the final nanolaminate product.

14. A batch or continuous process for fabricating the low porosity nanolaminate material of claim 13, in which the thickness of the nanolaminate is reduced in half by rolling or pressing; the or nanolaminate is then cut in half through the laminate layers and one half is stacked on the other half before it is rolled or pressed again.

15. A batch or continuous process for fabricating a low porosity nanolaminate material of claim 14, in which additives are incorporate into the engineered interfaces by coating the exposed surface of said nanolaminates before they are stacked in order to produce heat-, fracture-, and oxidation-impeding layers.

16. A batch or continuous process for fabricating a low porosity nanolaminate material of claim 14, in which a process comprising of rolling or pressing followed by cutting and stacking is repeated until the desired individual layer thickness of each material is achieved.

17. A batch or continuous process for fabricating the low porosity nanolaminate material of claim 1, in which the porosity of the low porosity nanolaminate environmental energy barrier material is less than 1%.

* * * * *